Aug. 23, 1932.   A. A. BULL   1,872,668
APPARATUS FOR FORMING AND CONTROLLING THE CIRCULATION
OF AIR IN INTERNAL COMBUSTION ENGINES
Filed Aug. 2, 1926   2 Sheets-Sheet 2
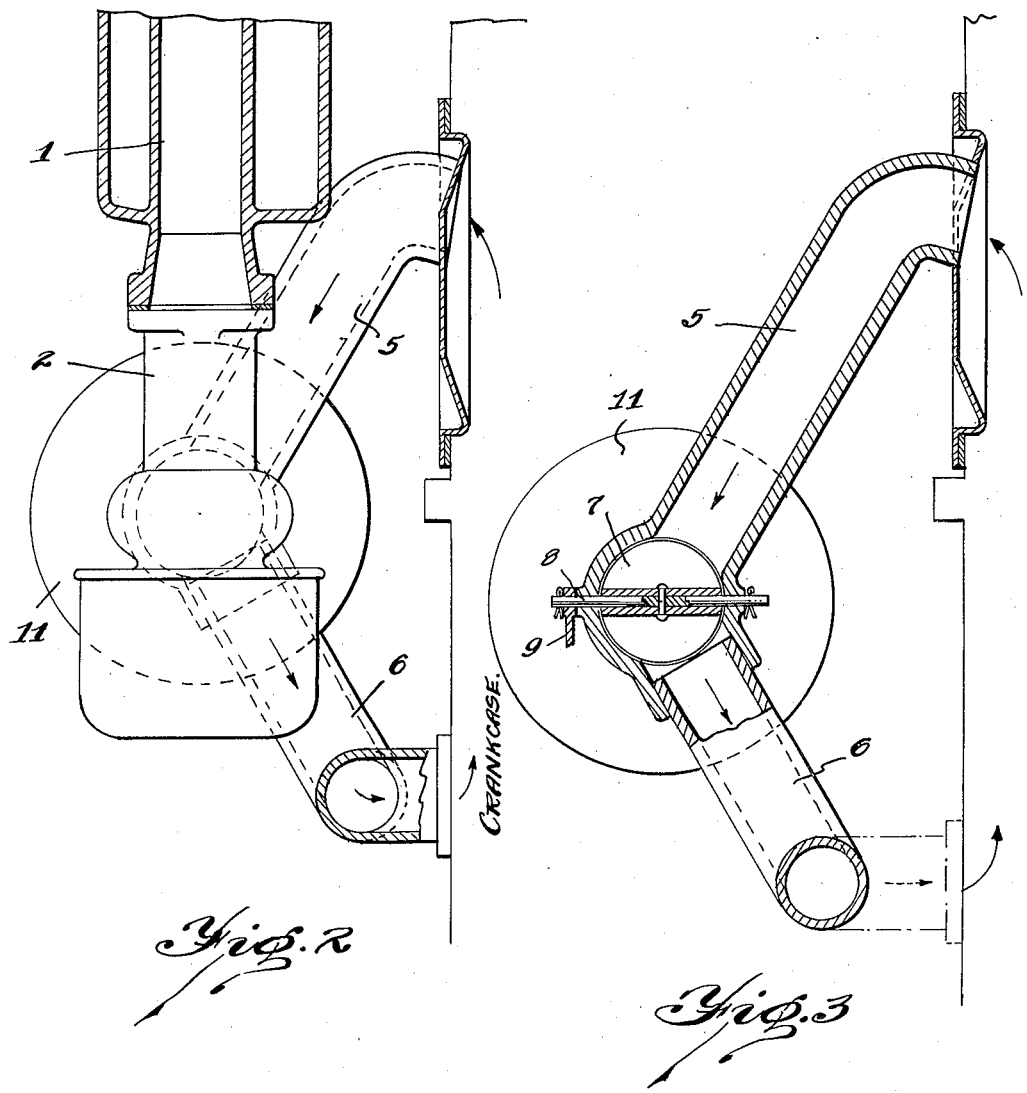
INVENTOR.
Arthur A. Bull
BY
Stuart C. Barnes
ATTORNEY.

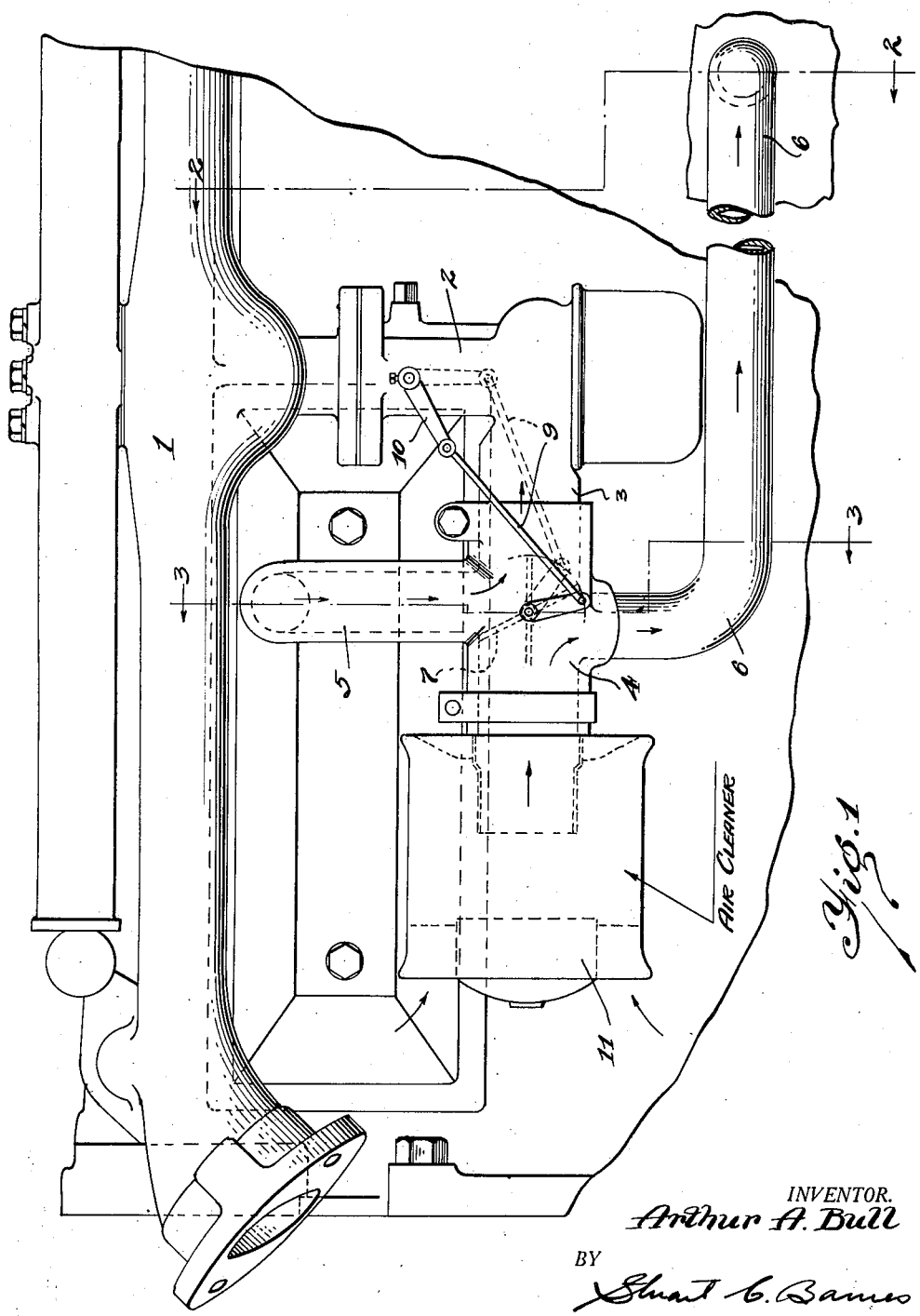

Patented Aug. 23, 1932								1,872,668

UNITED STATES PATENT OFFICE

ARTHUR A. BULL, OF DETROIT, MICHIGAN, ASSIGNOR TO CHRYSLER CORPORATION, OF HIGHLAND PARK, MICHIGAN, A CORPORATION OF DELAWARE

APPARATUS FOR FORMING AND CONTROLLING THE CIRCULATION OF AIR IN INTERNAL COMBUSTION ENGINES

Application filed August 2, 1926. Serial No. 126,466.

This invention relates to a method and apparatus for forming and controlling the circulation of air in internal combustion engines and has to do particularly with the provision of a novel type of apparatus for circulating air through the crank case of an internal combustion engine to effectually absorb the by-products of combustion in the crank case and remove the water vapors resulting therefrom. It also results in important efficiencies in internal combustion engine operation, in that all the air entering into the crank case and into the carburetor is introduced through a single inlet and the proportion of air circulating through the crank case or directly into the carburetor is regulated and predetermined.

One of the objects of my invention is the provision of a novel intake system that will not only control all the air entering into the carburetor but which will also automatically control to a predetermined degree the circulation of a certain amount of air through the crank case before entering the carburetor.
In this case I have made it possible to accurately and efficiently regulate the amount of air being passed through the crank case and before entering the carburetor in accordance with the different conditions of operation of the motor, as it will be obvious that under actual conditions and different conditions and different periods of operation of the motor, various amounts of air will be required.

A further object of this invention contemplates the connecting of a carburetor air intake system to the engine crank case in such a manner as to prevent the ejection of oil, smoke and the like and to prevent the resulting extremely disagreeable odors such as have been present in internal combustion engines of the prior art utilizing breathers or other free outlets.

A further object of the present invention is the provision of a carburetor intake manifold provided with an air cleaner for cleaning and controlling the introduction of air, and means whereby the cleaned air may be wholly or partially circulated through the crank case and then into the intake air port of the carburetor. In this arrangement the air controlling medium may be directly connected to the throttle operating means for the carburetor whereby when the engine is started or operating under a small load all, or a substantial part of the cleaned air may be circulated first through the crank case to absorb the by-products escaping by the piston and effectually remove the water vapors, and when the engine is operating at higher speed, or under a heavy load a large amount of the cleaned air is passed directly to the carburetor of the engine without passing through the crank case.

Various other features of my invention will be apparent as this description progresses and will be brought out in the claims appended hereto. The various objects of this invention are preferably obtained by the structure illustrated in the drawings wherein similar characters of reference designate corresponding parts, and wherein;

Fig. 1 is a fragmentary side elevation of an internal combustion engine embodying my invention and showing the manner of arranging and positioning the air circulating manifold and the air cleaner therefor.

Fig. 2 is a sectional view taken on line 2—2 of Fig. 1.

Fig. 3 is a sectional view taken on line 3—3 of Fig. 1 and showing the regulating valve in closed position.

In the embodiment illustrated in the drawings the internal combustion engine is shown as being provided with a manifold 1 to which may be connected a carburetor 2 of any desired design. This carburetor is provided with an air intake 3 to which is connected a manifold or air circulating housing 4. This housing 4 is provided with an outlet conduit 5 for conducting the air from the crank case towards the carburetor intake 3. Oppositely positioned from this outlet 5 is an inlet conduit 6 which preferably extends downwardly and forwardly and enters the crank case near the front end of the motor.

It will be obvious that the air in passing from the intake 6, through the crank case and to the outlet 5 will be caused to circulate over a considerable part of the crank case to effectually absorb the by-products escaping by the pistons and effectually remove the water vapors and prevent the accumulation of free water. Thus the air mixture preparatory to being combined with the fuel is not only enriched as to quality by the absorption of the by-products, but also performs the function of ventilating and absorbing the water vapors which would otherwise be very detrimental to the operation of the motor.

It will be understood that the outlet 5 and the intake 6 which connect the housing 4 to the crank case may be positioned at any desired point both horizontally and vertically with respect to the crank case housing, but in the preferred arrangement the said inlet and outlet, or inlets and outlets are positioned as widely remote from each other as possible, both as to horizontal and vertical positioning, in accordance with the particular design and arrangement of the motor.

The amount of air entering the intake conduit 6 is controlled and predetermined by means of a valve 7 which is referably circular in shape corresponding to the contour of the housing 4. This valve 7 is preferably supported and actuated by a suitable shaft 8 and this shaft 8 is connected by suitable linkage 9 to the carburetor throttle lever 10. In the form shown in the drawings the throttle lever 10 is so connected to the linkage 9 and the valve 7 that when such throttle lever approaches its closed position the valve 7 will be moved toward or to closed position as shown in dotted lines in Fig. 1, the contour of the housing 4 being such that the valve will contact with the surfaces thereof while still at an angle from the vertical. In other words, as shown in Fig. 1 the top and bottom edges of the valve 7 are preferably chamfered and so positioned that the upper half of the valve when in closed position will contact with the housing 4 adjacent the side of the outlet 5 which is farthest away from the carburetor 2, while the lower half of the valve 7 will contact with the housing 4 adjacent the side of the intake 6 which is nearest the carburetor 2. The inlet 6 and the outlet 5 of the crank case are preferably positioned slightly staggered with respect to the housing 4 whereby to assist in the initial deflection of the incoming air to the crank case and also to cooperate with the valve structure 7. It will be understood, however, that the position of such conduits 5 and 6 relative to the housing may be varied considerably and still make it possible to regulate and predetermine the amount of air entering the carburetor either indirectly through the crank case or directly through the housing 4 or both.

As the throttle lever 10 is moved from normal or closed position to enable more air to pass into the intake system the air control valve 7 will be correspondingly moved allowing some of the air to pass directly through the housing 4 to the intake conduit 3 and directly to the carburetor air valve. As the throttle valve 10 approaches its wide-open position the air control valve 7 will also be preferably moved towards horizontal or completely opened position to allow practically all the incoming air to enter directly into the mixing chamber of the carburetor.

The intake side of the housing 4 is preferably provided with an air cleaner 11 which may be of the type described in my copending application No. 26,869 filed April 30, 1925. By providing a single air cleaner for the intake end of the housing 4 it will be obvious that I have not only simplified the structure and made it more compact but that I have made it possible to accurately regulate and predetermine the amount of cleaned air which passes through the crank case or directly to the carburetor or both. It will be obvious that the housing 4 may be provided with any standard form of intake conduit whereby the air cleaner 11 may be positioned either vertically or horizontal, or in any position desired, the present form being merely shown as representing the preferred and more compact arrangement.

It will be understood that the linkage can be arranged so that little or no movement of the valve 7 occurs while the throttle lever 10 moves through the first part or the first one-third of its movement from a closed position. The relative angle between the lever 10 and the valve lever 7 will determine this. It will be obvious that this regulating and predetermining of the amount of air which passes through the crank case is very important, as it is very inefficient to direct all the air through the crank case at open throttle as difficulties will arise due to sucking out of oil vapors from the crank case. It will also be understood that the pipe 6 may be projected across the crank case to some desired position on the opposite side to effect a more thorough circulation of the air.

What I claim is:

1. An air system for internal combustion engines comprising a housing connected to the air intake of the carburetor, an inlet and outlet for said housing each connected to the crank case of the engine, and regulatable means for deflecting a portion of said air through one of said connecting means to circulate a portion of the air through the crank case before its entrance into the carburetor.

2. An air system for internal combustion engines comprising a single inlet for directing the air towards the carburetor, means positioned between said inlet and said carburetor adapted to direct and circulate air through the crank case of the engine and adjustable means for regulating the amount of air passing directly to the carburetor from said inlet, and the amount passing indirectly through the crank case.

3. An air system for internal combustion engines comprising an air intake for the carburetor, a housing for admitting air to the carburetor, inlet and outlet conduits connecting said housing with the crank case of the engine and means within said housing so positioned relative to said inlet and outlet that all the air may be deflected through one of said conduits of the crank case and admitted to the carburetor intake through the other conduit.

4. An air system for internal combustion engines comprising a carburetor air intake, an air cleaner positioned to direct a column of cleaned air towards said carburetor, and means positioned between said cleaner and said intake for directing all, or part of said air through the crank case of the engine, and means for admitting the portion of the air directed through the crank case to the carburetor.

5. An air system for internal combustion engines comprising an air intake, a housing positioned to direct a column of air towards said intake, conduits connecting said housing with the crank case of the engine, said conduits being out of alinement with respect to said housing and a valve in said housing adjustable to cause the air to pass through one conduit to the crank case and from the other conduit to the intake.

6. An air system for internal combustion engines comprising a carburetor air intake, means for directing a column of air towards said intake, conduits positioned to direct said column of air directly towards said carburetor intake and indirectly through the crank case, and means connected with the throttle lever of the carburetor for predetermining the amount of air passing indirectly and directly to the carburetor intake.

7. An air system for internal combustion engines comprising a carburetor intake, an air cleaner for directing a column of air towards said intake, a housing positioned between said cleaner and said intake, conduits connecting said housing with the crank case of the engine, means in said housing for controlling the amount of air passing directly through the housing to the carburetor or indirectly through the conduits and through the crank case, and means connecting the carburetor throttle lever with the said controlling means for predetermining the proportionate amount of air passing indirectly through said conduits and directly through said housing.

8. An air system for internal combustion engines, comprising means for directing air through the crank case and then to the carburetor, and means for directing air directly to the carburetor, and means for controlling the proportional amount of air directed to the crank case and/or to the carburetor according to the speed of the engine.

9. An air system for internal combustion engines, comprising air-cleaning means, means for directing air through the crank case and then to the engine, and means for directly conducting air to said engine, and means for controlling the amount of air passing indirectly through the crank case and directly to the engine, according to the speed of the engine.

10. In combination with an internal combustion engine including an air intake, openings into said intake from the crank case and from the outside, and means operable by a variation in the speed of the engine for simultaneously varying the effective sizes of said openings.

11. The combination with an internal combustion engine having a crank case and an air intake, of a throttle actuated damper controlled bypass from said intake to said crank case.

12. An internal combustion engine having a crank case provided with an inlet passage and an outlet passage, means for causing a stream of air to flow past the entrance to said inlet passage, a movable means for deflecting air into said entrance, and means for causing said movable means to operate inversely as the speed of the engine.

13. An internal combustion engine having a throttle valve and a crank case provided with an inlet passage and an outlet passage, means for causing a stream of air to flow past the entrance to said inlet passage, a movable means for deflecting air into said entrance, means connecting said movable means with the throttle and adapted to move said movable means away from deflecting position as the throttle valve is opened.

In testimony whereof I affix my signature.

ARTHUR A. BULL.